Aug. 24, 1954 R. ADLER 2,687,494
SIGNAL TRANSLATING DEVICE OF THE TRAVELING WAVE TYPE
Filed May 10, 1949 3 Sheets-Sheet 1

ROBERT ADLER
*INVENTOR.*
BY Francis W. Crotty
HIS ATTORNEY

Aug. 24, 1954 R. ADLER 2,687,494

SIGNAL TRANSLATING DEVICE OF THE TRAVELING WAVE TYPE

Filed May 10, 1949

3 Sheets-Sheet 2

ROBERT ADLER
*INVENTOR.*

BY Francis W. Crotty

HIS ATTORNEY

ROBERT ADLER
*INVENTOR.*
BY Francis W. Crotty
HIS ATTORNEY

Patented Aug. 24, 1954

2,687,494

UNITED STATES PATENT OFFICE 2,687,494

SIGNAL TRANSLATING DEVICE OF THE TRAVELING WAVE TYPE

Robert Adler, Chicago, Ill., assignor to Zenith Radio Corporation, a corporation of Illinois Application May 10, 1949, Serial No. 92,437

31 Claims. (Cl. 315—39)

Figure 1A:
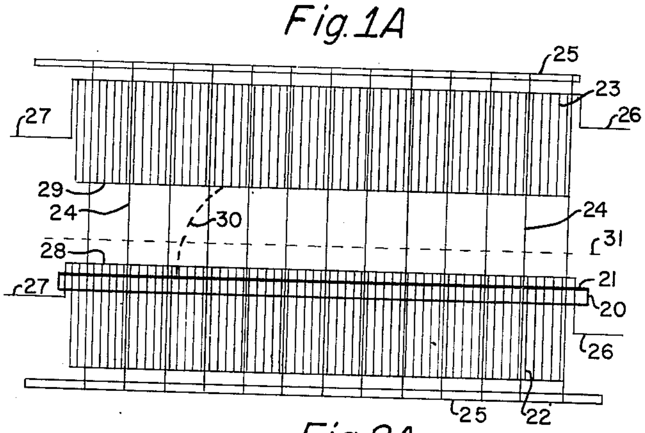

This application relates to signal translating devices, and more particularly to such devices of the traveling wave type.

It has been proposed to obtain an exponential increase in the amplitude of a signal wave traveling along a low-velocity helical transmission line by directing a concentrated electron beam longitudinally within the line and by so constructing the line that the propagation velocity of the traveling wave impressed on the line is substantially equal to that of the electron beam. A traveling wave device constructed in accordance with this principle is inherently restricted in its application to ultra-high frequencies greater than about 1,000 megacycles. Therefore, such prior art devices are not useful for radio-frequency amplification in the range between 100 and 1,000 megacycles.

It is an important object of the present invention to provide a novel signal translating device for obtaining an exponential increase in the amplitude of a signal wave traveling along a low-velocity transmission line at frequencies lower than the operating frequencies of hitherto proposed traveling wave tubes.

It is a further object of the present invention to provide a novel traveling wave tube for use at radio-frequencies in the range from 100 to 1,000 megacycles.

A signal translating device constructed in accordance with the present invention comprises a cathode having an elongated electron emissive surface, and a low-velocity transmission line having an axis substantially parallel with the emissive surface and having an axial length which is large relative to the effective wavelength of a signal wave traveling along the line. The transmission line comprises a longitudinal control portion for controlling the space electrons originating at the emissive surface and a longitudinal receptor portion electrically coupled to said control portion for deriving a signal from the controlled space electrons. Means including an additional electrode are provided for causing individual space electrons successively to interact with the control portion and the receptor portion of the line at points of instantaneously different phase of the traveling signal wave.

Figure 1B:
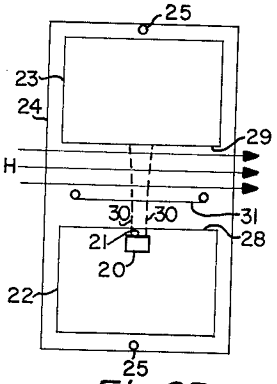
Figure 2A:
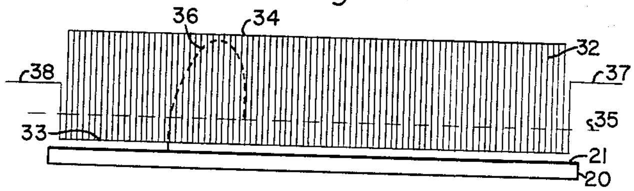
Figure 2B:
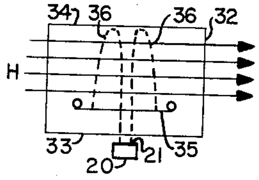
Figure 3:
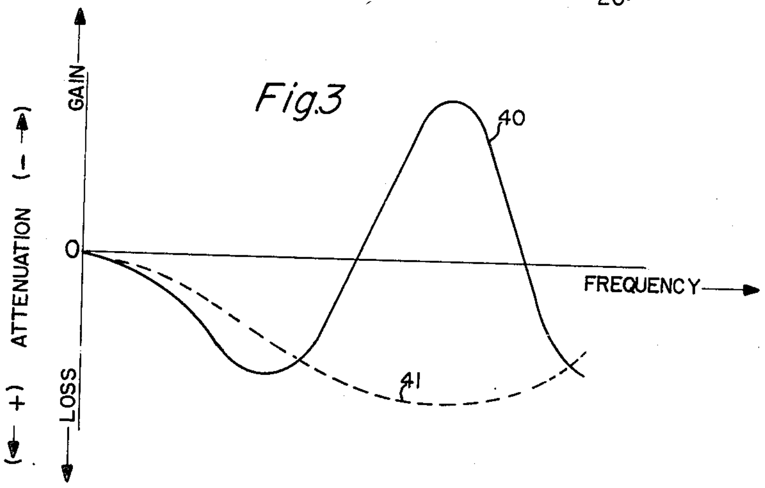
Figure 8A:
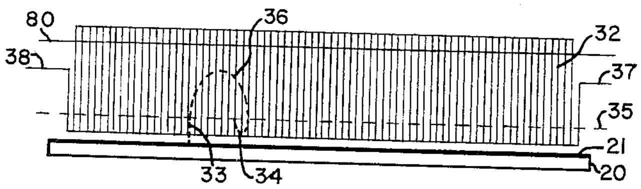
Figure 8B:
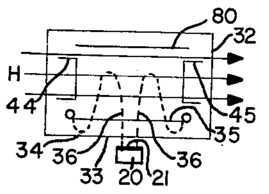
Figure 9A:
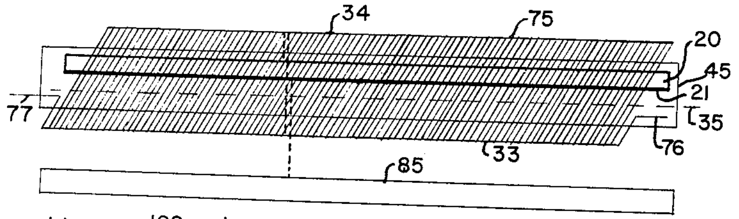
Figure 9B:
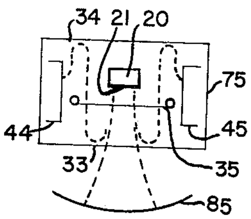
Figure 11:
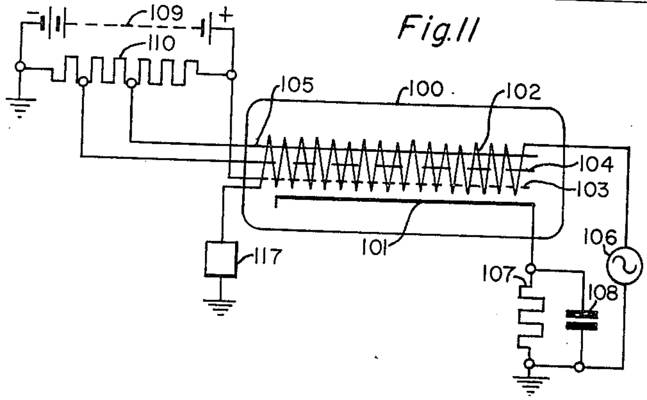
Figures 10, 12:
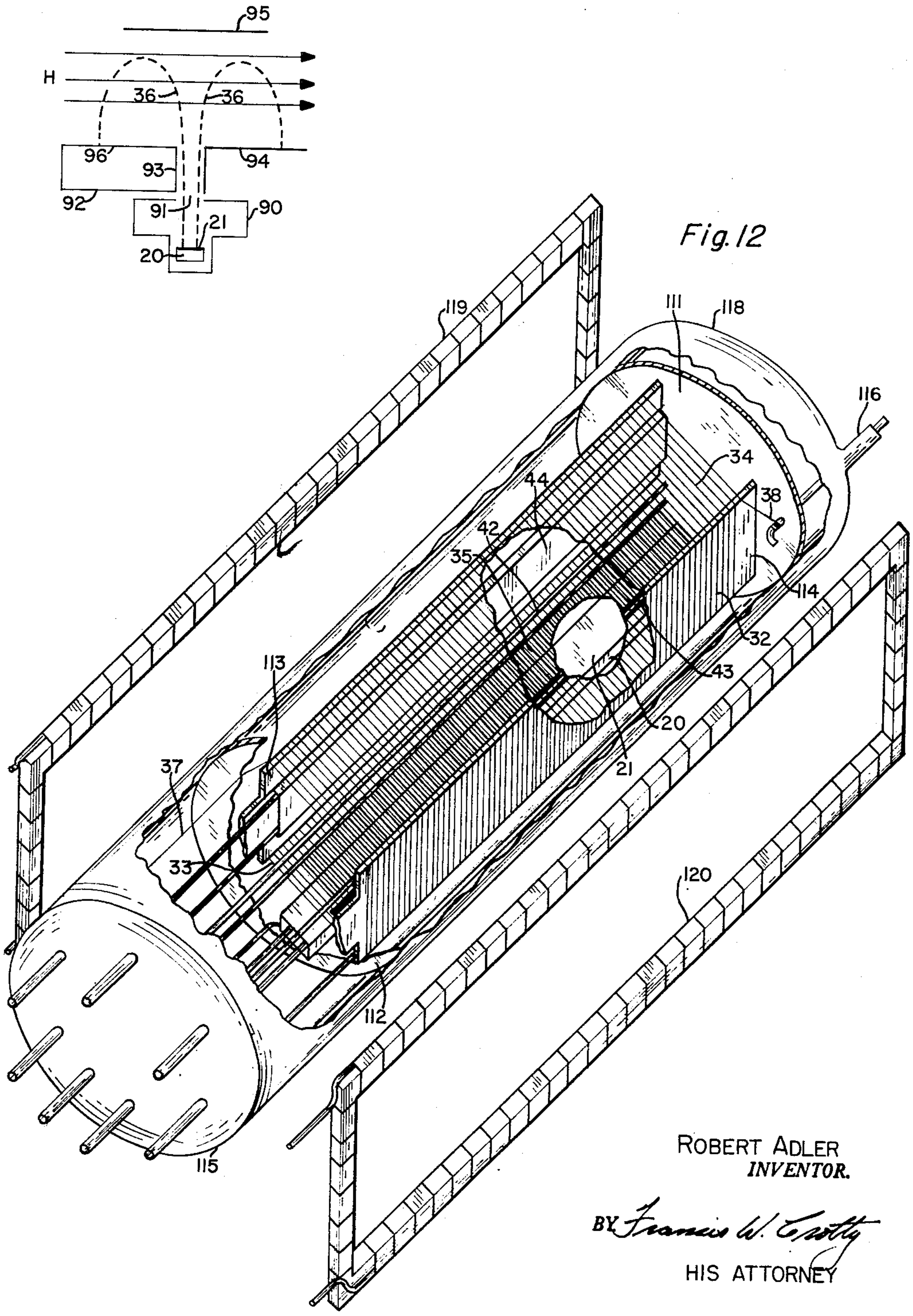

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figures 1A and 1B schematically represent a fundamental form of the present invention, Figures 2A and 2B schematically represent a signal translating device constructed in accordance with the invention, Figure 3 is a graphical representation of the attenuation characteristics of the device of Figures 2A and 2B, Figures 4 and 5 are schematic end views of other embodiments of the invention, Figures 6A, 6B, 7A, 7B, 8A, 8B, 9A, 9B and 10 are schematic representations of further embodiments of the invention, Figure 11 is a schematic circuit diagram of an amplifier embodying a signal translating device constructed in accordance with the invention, and Figure 12 is a perspective view, partly cut away, of a signal translating device constructed in accordance with the invention.

To facilitate an explanation of the principles involved in the present invention, exemplary electron discharge devices constructed according to the invention are illustrated in schematic form. It should be understood throughout the specification and in the appended claims that in all cases the tube elements are enclosed within an envelope which is usually evacuated.

Briefly, the present invention contemplates effecting a direction-sensitive attenuation characteristic in a low-velocity transmission line by causing space electrons to interact with the line along specific trajectories. Each individual portion of the electron stream is caused to interact twice with portions of the transmission line. At the first interaction, the instantaneous potential of one portion of the line controls the number or direction of the space electrons, and at the second interaction, the same electrons induce a signal corresponding to their number or direction in a second portion of the line axially displaced from the first portion. The direction and approximate magnitude of the axial displacement remain constant throughout the length of the line, and the electron transit time between the instants of first and second interaction is also maintained approximately constant for all space electrons.

For a given signal impressed on one end of the line, it is possible to find a condition for the electron transit time, and for the magnitude and direction of the axial displacement, at which the signal induced by the controlled electrons everywhere reinforces the signal wave traveling through the line. Such a condition corresponds to a negative attenuation constant, with the result that the amplitude of the signal wave increases exponentially in its travel along the line. Under such a condition, when a similar signal wave is impressed on the other end of the line, traveling in the opposite direction, the electron transit time and the magnitude of the axial displacement remain the same, but the direction of the axial displacement, relative to the direction in which the signal wave travels, becomes opposite. The attenuation constant for a signal wave traveling in the reverse direction is therefore generally different than that for a signal wave traveling in a forward direction and may be made positive with the result that a signal wave traveling in the reverse direction is attenuated. If the loss encountered by a signal wave traveling in the reverse direction is made at least as large as the gain of a signal wave traveling in the forward direction, and if the line is properly terminated at both ends, the line becomes stable regardless of its length.

An electron discharge device embodying this principle may be constructed as shown schematically in Figures 1A and 1B, Figure 1A being a schematic side view and Figure 1B a schematic end view of the device. The device comprises a cathode 20 having an elongated electron emissive surface 21, and a pair of conductive helices 22 and 23 the axes of which are substantially parallel with emissive surface 21. Helices 22 and 23 are inductively coupled together, by means of a plurality of coupling loops 24, at a sufficient number of points so that the two helices effectively become a single low-velocity transmission line from the standpoint of wave propagation, and helices 22 and 23 are each constructed to have an axial length which is large relative to the effective wavelength of a signal wave traveling along the line. Coupling loops 24 may be supported by closely adjacent helices 22 and 23 by means of supporting posts 25. Thus, a signal wave impressed on input terminals 26 of helices 22 and 23, which may be connected in parallel by means of a blocking condenser (not shown), subsequently appears at the opposite terminals 27 of helices 22 and 23, which may also be connected in parallel by means of a blocking condenser (not shown).

Electrons emitted from cathode surface 21 first encounter a control portion 28 of helix 22 which is closely adjacent that surface. Upon traversing control portion 28, the electrons are controlled in number by the instantaneous potential of the traveling signal wave at the point of traversal. Helix 22 is maintained at a potential near that of cathode 20 by connection to cathode 20 either directly or through a suitable biasing potential source (not shown), so that control portion 28 functions as a high-transconductance intensity control grid. Helix 23 is maintained at a positive direct operating potential by connection to a suitable positive operating potential source (not shown) so that electrons emerging from control portion 28 are attracted to a receptor portion 29 of helix 23. Individual space electron trajectories 30 are schematically illustrated to facilitate an understanding of the operation of the invention.

In order to provide longitudinal displacement of the space electrons emerging from control portion 28, a weak transverse magnetic field H is impressed in the region between control portion 28 and receptor portion 29. As is well known, the presence of a magnetic field causes space electrons to be deflected in a direction mutually perpendicular to the direction of electron travel and the direction of the magnetic field. Thus, the point of interaction of electrons traveling along trajectories 30 with receptor portion 29 is longitudinally displaced with respect to the point of interaction of those electrons with control portion 28. In order to permit electron trajectories of a length sufficient to obtain a longitudinal displacement of the desired size, an accelerating electrode 31 is interposed between control portion 28 and receptor portion 29.

In operation, a signal wave is impressed on terminals 26 and the direct operating potentials applied to accelerating electrode 31 and to helix 23 are adjusted to provide an electron transit angle, measured along the electron trajectories from control portion 28 to receptor portion 29, of 90° at the signal frequency. The magnetic field intensity H is adjusted to provide a longitudinal deflection of electron trajectories 30 of one-fourth of the effective wavelength of the signal wave traveling along the line. Under these conditions, when an output load (not shown) is connected to terminals 27, the traveling signal wave undergoes an exponential increase in amplitude as it travels along the line.

The operation of the device of Figures 1A and 1B may perhaps be best understood from the following considerations. For an input signal of low frequency, the electron transit time becomes negligible and the longitudinal electron deflection becomes negligible with respect to the effective wavelength of the traveling signal wave. Under these conditions, the device produces attenuation, the output signal being 180° out of phase with the input signal and being coupled to the input signal by means of coupling loops 24. This 180° phase difference between output signal and input signal is caused by phase reversal in the device as in any grid-controlled triode.

If a high-frequency input signal wave is applied to terminals 27, the device also produces attenuation, since the longitudinal deflection results in an effective phase shift between output signal and input signal which tends to compensate for the phase shift due to the electron transit time. This condition obtains, for instance, when the input signal frequency is such that the electron transit angle between control portion 28 and receptor portion 29 is 90° and the longitudinal deflection of the electron trajectories 30 is one-fourth of the effective wavelength of the traveling signal wave. Now, if the direction of propagation of the signal wave is reversed by applying the input signal to terminals 26, the device produces gain because the effective phase shift caused by the longitudinal deflection of the electron trajectories 30 adds to the phase shift caused by electron transit time, producing a total of 180° of additional phase shift. Thus, the induced output signal reinforces the traveling input signal wave, and exponential amplitude increase is obtained.

For convenience, the direction of signal wave propagation for signal reinforcement is termed the forward direction, and is from right to left in all the illustrated embodiments. Similarly, the direction of signal wave propagation for signal attenuation is termed the reverse direction.

While the device illustrated schematically in Figures 1A and 1B is operative in accordance with the invention, it will be appreciated that, as a practical matter, the constructional details may afford considerable difficulty. A device embodying the invention, while affording the advantage of mechanical simplicity, is illustrated schematically in Figures 2A and 2B, Figure 2A being a schematic side view and Figure 2B being a schematic end view of the device.

The device of Figures 2A and 2B comprises a cathode 20 having an elongated electron emissive surface 21, and a low-velocity helical transmission line 32 longitudinally disposed opposite emissive surface 21 and having an axial length which is large relative to the effective wavelength of a signal wave traveling along the line. Transmission line 32 has a control portion 33 adjacent surface 21 and a receptor portion 34 opposite control portion 33 and electrically connected thereto by virtue of the fact that control portion 33 and receptor portion 34 are different parts of a single continuous helical line. An accelerating electrode 35 is longitudinally disposed within line 32 adjacent control portion 33 on the side thereof opposite emissive surface 21. Individual electron trajectories 36 are illustrated to facilitate an explanation of the operation of the device. A transverse magnetic field H is impressed by any suitable means, such as a permanent magnet or an electromagnetic coil, in the region between control portion 33 and receptor portion 34.

In operation, transmission line 32 is maintained at a direct potential near that of cathode 20, and the value of the positive unidirectional operating potential applied to accelerating electrode 35 is adjusted so that the electron transit angle measured along the electron trajectories from control portion 33 to receptor portion 34 is substantially 180° at the signal frequency. A signal wave is impressed on an input terminal 37 at one end of line 32, and an output load (not shown) is connected to an output terminal 38 at the other end of line 32. The value of the magnetic field intensity H is adjusted to deflect the space electrons longitudinally with respect to the line to provide an axial displacement between the point of interaction of space electrons with receptor portion 34 and the point of interaction of those electrons with control portion 33 of substantially one-fourth of the effective wavelength of the traveling signal wave.

Under these conditions, control portion 33 functions as a high transconductance control grid, controlling the number of space electrons in accordance with the instantaneous signal wave appearing on line 32. Since receptor portion 34 is maintained at or near the direct potential of cathode 20, and since receptor portion 34 follows accelerating electrode 35 in the direction of travel of the space electrons, a signal is induced at receptor portion 34 by virtue of space charge coupling between the electron stream and that portion of the line. As is well known in the art, space charge coupling may be likened phasewise to a unidirectional negative capacity. Thus, the signal current induced at receptor portion 34 by space charge coupling lags the intensity variations of the adjacent portion of the electron stream by 90°.

For a signal wave traveling in the forward direction, from input terminal 37 to output terminal 38, the signal induced by space charge coupling from the electron stream reinforces the impressed input signal wave. That such reinforcement occurs is apparent when it is considered that the phase difference between the signal induced at the receptor portion 34 and the controlling signal at control portion 33 is substantially 360° at the signal frequency—180° due to the electron transit angle, 90° due to the longitudinal deflection of the space electrons, and 90° due to space charge coupling.

For a signal wave traveling along line 32 in the reverse direction, from terminal 38 to terminal 37, the signal induced at receptor portion 34 is substantially in counterphase with the signal at control portion 33, since the 180° shift due to electron transit angle and the 90° shift due to space charge coupling remain unchanged, but the 90° effective phase shift caused by the longitudinal deflection of the space electrons is in the opposite direction relative to the direction of propagation of the signal wave. Thus, a direction-sensitive attenuation characteristic is imparted to transmission line 32, and a stable exponential amplitude increase of a signal wave traveling in the forward direction may be obtained.

Figure 3 is a graphical representation of a typical attenuation characteristic obtainable with a device constructed in accordance with Figures 2A and 2B for a particular adjustment of operating potentials and magnetic field intensity. In Figure 3, attenuation is plotted as a function of signal frequency and direction of signal wave propagation. The solid curve 40 represents the attenuation characteristic for signal propagation in the forward direction, from terminal 37 to terminal 38 in Figure 2A. The dotted curve 41 represents the attenuation characteristic for a signal wave traveling in the reverse direction, from terminal 38 to terminal 37 in Figure 2A. The frequency band within which negative attenuation or gain is attained for signals traveling in the forward direction may have a width of a substantial fraction of the signal center frequency; for instance, 60 megacycles at a center frequency of 300 megacycles. From an inspection of the curves, it is apparent that, within the band where gain is obtained for signals traveling in the forward direction, the attenuation for signals traveling in the reverse direction is high enough to achieve stable operation.

Figure 4:
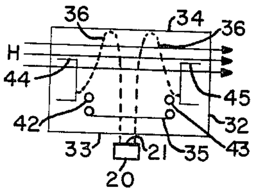

Figure 4 is a schematic end view of a modification of the electron discharge device of Figures 2A and 2B. The device schematically illustrated in Figure 4 differs from that of Figure 2B only in the provision of focusing electrodes 42 and 43 and collector electrodes 44 and 45. The provision of these additional electrodes improves the operating characteristics of the device by establishing well defined boundary potentials, thereby providing a more stringent control of the shape of the electron trajectories. Collector electrodes 44 and 45 may best be operated at a lower potential than accelerating electrode 35 but at a higher potential than focusing electrodes 42 and 43. Collector electrodes 44 and 45 may also provide supports for mica sheets on which line 32 may be wound.

Figure 5:
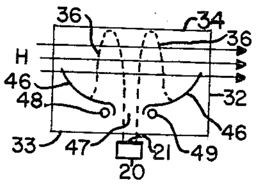

Figure 5 is a schematic representation of a further modification utilizing a solid accelerating electrode 46 having a central aperture 47 instead of a grid-type accelerating electrode as shown and described in connection with previous embodiments. In this embodiment, focusing electrodes 48 and 49 are disposed adjacent aperture 47 between accelerator 46 and control portion 33; focusing electrodes 48 and 49 may best be operated at a potential at or near that of cathode 20. The solid accelerator affords the advantage over grid-like accelerators of diminished partition or interception noise.

Figure 6A:
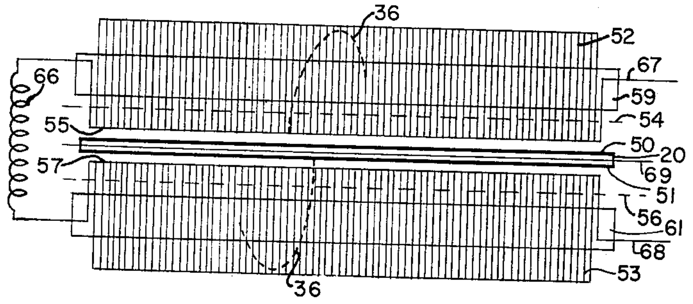
Figure 6B:
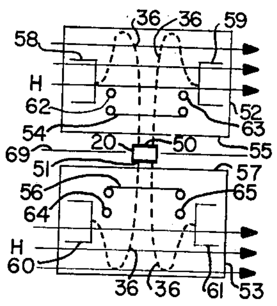

Figures 6A and 6B represent schematically a single-ended electron discharge device constructed in accordance with the present invention, Figure 6A being a schematic side view and Figure 6B a schematic end view of the device. Cathode 20 is provided with a pair of oppositely disposed elongated electron emissive surfaces 50 and 51. A low-velocity helical transmission line 52 is longitudinally disposed opposite emissive surface 50, and a second low-velocity helical transmission line 53 is longitudinally disposed opposite emissive surface 51. Accelerating electrode 54 is longitudinally disposed within line 52 adjacent a control portion 55 of that line on the side thereof remote from emissive surface 50, and a second accelerating electrode 56 is similarly disposed with regard to a control portion 57 of line 53. Suitable frame or collector electrodes 58–61 are provided to establish well-defined boundary potentials, and focusing electrodes 62–65 are provided for control of the electron trajectories 36.

Adjacent ends of transmission lines 52 and 53 are coupled together by means of an impedance-matching coil 66; alternatively, the coupling between lines 52 and 53 may comprise a curved helical transmission line. An input terminal 67 for receiving an input signal wave is provided at the free end of line 52, and an output terminal 68 is provided at the free end of line 53 for connection to a suitable load thereby to derive an output signal. An electrostatic shield 69 is provided between input terminal 67 and output terminal 68. As before, a transverse magnetic field H is provided to deflect the electron trajectories 36 longitudinally of the transmission lines.

The device illustrated schematically in Figures 6A and 6B comprises in essence a pair of cascade-connected structures each similar to the device of Figures 2A and 2B. Since the direction of space electron travel is opposite for the two transmission lines, and since the transverse magnetic field H is impressed in the same direction for both lines, the electron trajectories associated with the respective lines are deflected in opposite directions. If a signal is impressed on the input terminal 67, a signal wave travels along line 52 in a direction from right to left, and subsequently along line 53 in a direction from left to right. Thus, the signal wave is amplified in its travel along both lines as discussed in connection with Figures 2A and 2B.

The device of Figures 6A and 6B affords several advantages. In the first place, it is a single-ended device, and no input or output terminal is required at the top of the tube. In the second place, it incorporates essentially two cascaded stages of traveling wave amplification in a structure the physical size of which may be substantially the same as that of the device of Figures 2A and 2B, which comprises only a single stage. As a further advantage, broad band amplifying characteristics may be readily attained by applying different positive unidirectional operating potentials to corresponding electrodes associated with each of the lines 52 and 53, thereby imparting different direction-sensitive attenuation characteristics to the two transmission lines. For instance, the potentials applied to accelerating electrode 54, focusing electrodes 62 and 63, and collector electrodes 58 and 59, may be so selected that maximum gain is obtained in this part of the structure at a predetermined frequency, say 300 megacycles; the potentials applied to the corresponding electrodes 56, 64 and 65, and 60 and 61 in the other half of the structure may be adjusted to higher values to obtain shorter transit time and, correspondingly, maximum gain at a higher frequency, say 350 megacycles. The effect so attained is analogous to that provided by so-called stagger-tuning in conventional cascaded radio-frequency amplifiers. A similar effect may be obtained by utilizing predetermined different electrode spacings for each half of the device.

Figure 7A:
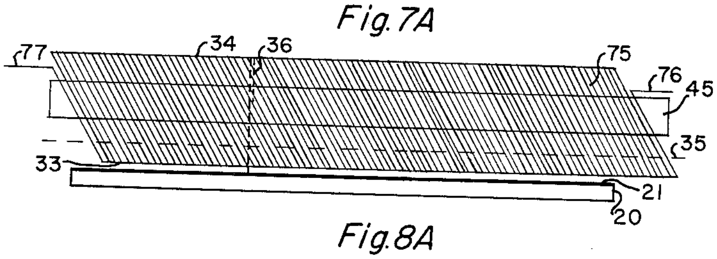

In all of the embodiments discussed thus far, a direction-sensitive attenuation characteristic is imparted to a low-velocity transmission line by providing a physical deflection of the electron trajectories, as by means of a magnetic field. The device illustrated schematically in Figures 7A and 7B achieves a direction-sensitive attenuation characteristic without the necessity of employing a transverse magnetic deflecting field. Figure 7A is a schematic side view of the device and Figure 7B is a schematic end view thereof.

Figure 7B:
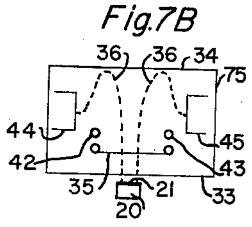

The device of Figures 7A and 7B is quite similar in many respects to that of Figures 2A and 2B. A low-velocity helical transmission line 75 is longitudinally disposed opposite the elongated electron emissive surface 21 of a cathode 20, and an accelerating electrode 35 is longitudinally disposed within transmission line 75 adjacent a control portion 33 of that line on the side thereof remote from emissive surface 21. Focusing electrodes 42 and 43 and collector electrodes 44 and 45 are provided as in the embodiment of Figure 4.

In operation, when a signal wave is impressed on the input terminal 76 of transmission line 75, and a suitable load is coupled to the output terminal 77 of that line, exponential signal wave amplitude increase is achieved. As in the embodiment of Figures 2A and 2B, transmission line 75 is maintained at a direct potential at or near that of cathode 20, and control portion 33 functions as a high transconductance control grid to control the number of space electrons in accordance with the instantaneous signal wave potential. As before, a signal corresponding to the number of space electrons passed by control portion 33 is induced at receptor portion 34 of transmission line 75 by space charge coupling. The direct operating potential applied to accelerating electrode 35 is adjusted to provide an electron transit angle measured along the electron trajectories from control portion 33 to receptor portion 34 of substantially 180° at the signal frequency. The space charge coupling effect provides an additional phase shift between output signal and input signal of 90°, making a total of 270°. The additional 90° effective phase shift required to provide signal reinforcement and to effect a direction-sensitive attenuation characteristic is, however, provided in a different manner, so that no physical longitudinal deflection of the electron trajectories 36 is required. The necessary effective displacement between the point of interaction of the space electrons with receptor portion 34 and the point of interaction of those electrons with control portion 33 is provided by winding transmission line 75 obliquely with respect to the longitudinal axis, in such a way that the elements of each pair of opposite sides of the line (top and bottom, and front and back) are parallel. The angle of obliquity is so chosen that transversely aligned points on control portion 33 and receptor portion 34 repersent an effective displacement with respect to the traveling signal wave of substantially one-fourth of the effective wavelength of the signal wave traveling along the line. Thus, for signals traveling in the forward direction from input terminal 76 to output terminal 77, negative attenuation or gain is achieved, and for signals traveling in the reverse direction from terminal 77 to terminal 76, positive attenuation or loss is encountered.

A further embodiment, capable of operation at much lower frequencies than the embodiments previously discussed, is illustrated schematically in Figures 8A and 8B, Figure 8A being a schematic side view and Figure 8B a schematic end view of the device. The device of Figures 8A and 8B is physically similar in most respect to that of Figures 2A and 2B, with the exception that a repeller electrode 80 is longitudinally disposed within transmission line 32 opposite accelerating electrode 35. Frame electrodes 44 and 45 are provided as in the embodiment of Figure 4; however, in the present embodiment these electrodes are maintained at or near the potential of cathode 20.

In operation, repeller electrode 80 is maintained at or near cathode potential with the result that the space electrons emitted from surface 21 under the control of line portion 33 are turned around and redirected toward accelerating electrode 35. Consequently, the electron transit time is of the order of twice that obtained with a structuer such as that shown in Figures 2A and 2B, and lower operating frequencies may be attained. As in the previous embodiments, space electrons emitted from surface 21 traverse a control portion 33 of the transmission line 32 which operates as a high transconductance control grid to control the number of space electrons in accordance with the instantaneous signal potential. However, in this embodiment, receptor portion 34, at which the space electrons induce by space charge coupling a signal corresponding to their number, is transversely adjacent control portion 33; this may most readily be seen in Figure 8B. The potentials applied to accelerating electrode 35 and repeller electrode 80 are adjusted to provide an electron transit angle between control portion 32 and receptor portion 34 of substantially 180°, or an odd integral multiple thereof. The required longitudinal space electron deflection is provided by a transverse magnetic field H, and has a magnitude of substantially one-fourth of the effective wavelength of a signal wave traveling along the line. Since the space electrons follow longer trajectories in this embodiment than in previously described embodiments, greater electron transit time may be provided for a given size structure, and lower operating frequencies may be attained. It should be mentioned that a structure is capable of functioning as indicated even without repeller electrode 80 by suitably adjusting the operating potential of accelerating electrode 35; repeller electrode 80 is only provided to insure operation in this mode.

A further embodiment, incorporating a negative transconductance control portion, is illustrated schematically in Figures 9A and 9B, Figure 9A being a schematic side view and Figure 9B a schematic end view of the device. In this embodiment, a low-velocity obliquely wound helical transmission line 75 is disposed around a cathode 20 having an elongated electron emissive surface 21. An accelerating electrode 35 is longitudinally disposed within line 75 opposite emissive surface 21. Collector electrodes 44 and 45 are provided as before, and an additional longitudinal collector electrode 85 is provided externally of transmission line 75.

With this arrangement, a virtual cathode is set up adjacent control portion 33, and control portion 33 functions as a negative transconductance control grid, the rejected electrons being subsequently utilized to induce a reinforcing signal at receptor portion 34. Collector electrode 85 is provided to collect space electrons passed by control portion 33; this electrode is of a curved configuration as illustrated to cause the space electrons to diverge. Rejected space electrons are redirected toward accelerating electrode 35 and thence toward receptor portion 34, where they induce a reinforcing signal by space charge coupling. The space electrons are subsequently collected by electrodes 44 and 45.

With the arrangement of Figures 9A and 9B, the phase conditions are reversed from those obtained with the structure of Figures 7A and 7B because control portion 33 functions as a negative-transconductance control electrode. Thus, in order to obtain the desired direction-sensitive attenuation characteristic, the angle of obliquity of transmission line 75 is opposite to that of the embodiment of Figures 7A and 7B.

Figure 10 is a schematic end view of a further embodiment of the invention. In Figure 10, a cathode 20 having an elongated electron emissive surface 21 is arranged within a beam forming member 90 having an aperture 91 directly opposite emissive surface 21. A low-velocity helical transmission line 92, having an axis substantially parallel with emissive surface 21 and having an axial length which is large relative to the effective wavelength of a signal wave traveling along the line, is disposed with a control portion 93 adjacent the path of space electrons emerging from aperture 91. An accelerating electrode 94 is disposed opposite control surface 93, and transmission line 92 and accelerating electrode 94 are maintained at a positive unidirectional operating potential to provide an accelerating electric field. Thus, cathode 20, beam forming member 90, transmission line 92, and accelerating electrode 94 constitute an electron gun for producing a sheet-like electron beam of substantially rectangular cross section. A repeller electrode 95 is disposed in the path of the electron beam to reverse the electron trajectories. A transverse magnetic field H is provided to deflect the electron trajectories longitudinally of the device.

In operation, the electron beam emerging from aperture 91 is placed under the deflection control of the instantaneous signal potential appearing at control portion 93 of transmission line 92; thus, the direction of the space electrons is controlled in accordance with the input signal wave applied to line 92. The electrons are then projected into a retarding electric field set up by repeller electrode 95, which is maintained at or near the potential of cathode 20, and, because of the increased space charge, the returning electrons diverge. Some of the returning electrons are collected by accelerating electrode 94, and the remainder are collected by a receptor portion 96 of transmission line 92; the distribution of the returning space electrons between receptor portion 96 and accelerating electrode 94 is determined by the signal potential at control portion 93. The operating potentials of the various electrodes are adjusted so that the electron transit angle at the signal frequency is substantially 90°, and the magnetic field intensity H is adjusted to provide a longitudinal deflection of the electron trajectories 36 which is substantially equal to one-fourth of the effective wavelength of the signal wave traveling along the line 92.

Under these conditions, the signal induced at receptor portion 96 reinforces the traveling signal wave; 180° of the required phase shift is due to the phase reversal in the device as in a conventional space-current-control electron discharge device employing a positive output electrode; 90° is effected by the electron transit time, and the remaining 90° is effected by the longitudinal deflection of the electron trajectories caused by the magnetic field. For signals traveling along the line in the opposite direction, the induced signal is in substantial counterphase with the traveling signal wave because the longitudinal deflection is in the opposite direction with respect to the direction of propagation of the signal wave.

If the electron transit angle is set at 270° at the signal frequency, amplification is attained in the reverse direction and attenuation in the forward direction. More generally, conditions respectively similar to those described for electron transit angles of 90° and 270° may also be realized if integral multiples of 360° are added to these transit angles.

The device of Figure 10 may be modified to operate without a magnetic field H by obliquely winding transmission line 92, the angle of obliquity being such that the longitudinal displacement between the point of interaction of the space electrons with receptor portion 96 and the point of interaction of the space electrons with control portion 93 is substantially one-fourth of the effective wavelength of the signal wave traveling along the line.

As a further modification, accelerating electrode 94 may be replaced by a second positively-biased low-velocity helical transmission line; with such an arrangement, balanced input and output signals may be employed.

Traveling-wave tubes employing principles of deflection-control are disclosed and claimed in the copending application of Robert Adler, Serial No. 216,211 filed March 17, 1951, for "Signal-Translating Devices of the Traveling-Wave Type" and assigned to the present assignee.

It will be appreciated that the phase conditions mentioned throughout the discussion are optimum conditions, and useful amplification may be obtained with phase conditions deviating somewhat from the optimum; thus, useful amplification of signals for frequencies throughout a predetermined frequency band may be obtained. It is to be understood that the invention as set forth in the appended claims is not to be limited to the optimum phase conditions discussed; rather, reasonable deviations from the optimum phase conditions are contemplated in the interpretation of the claims.

Figure 11 is a schematic circuit diagram of an amplifier embodying an electron discharge device constructed in accordance with the present invention. The device 100 comprises a cathode 101, a low-velocity helical transmission line 102, an accelerating electrode 103, a focusing electrode 104, and a collector electrode 105. Device 100 may be constructed in accordance with the embodiment of Figures 7A and 7B; elements 101—104 of the schematic diagram of Figure 11 correspond respectively to elements 20, 75, 35, 42—43, and 44—45 of Figure 7B. An input signal source 106 is coupled between one end of transmission line 102 and ground, and a cathode resistor 107, shunted by a bypass condenser 108, is connected between cathode 101 and ground. An output load 117 is connected between the other end of transmission line 102 and ground. Preferably, both input signal source 106 and output load 117 are matched to the characteristic impedance of transmission line 102. Suitable positive unidirectional operating potentials are applied to electrodes 103—105 from a battery or other operating potential source 109 by means of a voltage divider 110.

It is to be understood that, in order to secure amplification of the input signal wave, that wave must be impressed on transmission line 102 in the forward direction as explained in connection with preceding figures. The input signal then appears in amplified form in output load impedance 117.

If device 100 is constructed in accordance with certain other embodiments, transverse magnetic field producing means may be necessary, and the operating potentials of the various electrodes may be different.

Figure 12 is a perspective view, partly cut away, of a signal translating device constructed in accordance with the invention. The device of Figure 12 is constructed in accordance with the schematic representation of Figures 2A and 2B modified in accordance with Figure 4 and comprises an elongated cathode 20, a low-velocity helical transmission line 32, an accelerating electrode 35, focusing electrodes 42 and 43, and collector electrodes 44 and 45 supported within an evacuated envelope 118 between a pair of mica spacers 111 and 112. Transmission line 32 is wound around supporting mica sheets 113 and 114 which are supported between mica spacers 111 and 112 by means of collector electrodes 44 and 45. One end 37 of the transmission line 32 is extended through the tube base 115 to furnish one signal terminal for the device, and the other end 38 of the transmission line 32 is extended through a sealed tubulation 116 at the top of evacuated envelope 118 to provide a second signal terminal. The remaining electrodes are extended through tube base 115 for connection in an external circuit. A customary getter ring and getter material (not shown) are provided for absorbing residual occluded gases after evacuation. A pair of coils 119 and 120 are suitably oriented with respect to the device to provide a magnetic field in the proper direction when excited from a suitable constant potential source. Alternatively, the magnetic field producing means may be a permanent magnet or of any other equivalent construction.

Merely by way of illustration and in no sense by way of limitation, the device of Figure 12 may be constructed with an axial active length of all electrodes of about 1½ inches. The distance between electron emissive surface 21 and control portion 33 may be 0.012-inch, and the distance between control portion 33 and accelerating electrode 35 may be 0.055-inch. Line 32 may be wound of 1½-mil molybdenum wire with a pitch of 60 turns per inch, and the distance between control portion 33 and receptor portion 34 (the width of the line) may be 0.230-inch. With a device so constructed, a maximum gain of about 10 decibels at a signal frequency of 280 megacycles, and a band width 3 decibels down from 267 to 293 megacycles, may be obtained by utilizing a magnetic field intensity of from 10 to 15 gauss, a potential at accelerating electrode 35 of 84 volts, a potential at collector electrodes 44 and 45 of 44 volts, and a potential at focusing electrodes 42 and 43 of 30 volts.

The present invention provides in its several embodiments, a novel electron discharge device of the traveling wave type which is particularly useful for amplification of signal waves in the frequency range between 100 and 1,000 megacycles. It is contemplated that the invention may be employed to advantage in other types of electronic circuits, as for example in phase modulator circuits and in mixer or converter stages of superheterodyne receivers. The appended claims are therefore to be interpreted to cover the device in any of its useful applications.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A signal translating device comprising: a cathode having an elongated electron emissive surface; a low-velocity wave-transmission line having an axis substantially parallel with said surface and having an axial length which is large relative to the effective wavelength of a signal wave traveling along said line and further having a longitudinal control portion for controlling in accordance with said traveling wave the space electrons originating at said surface and a longitudinal receptor portion electrically coupled to said control portion for deriving a signal from said controlled space electrons; and means including an additional electrode for causing individual space electrons successively to interact with said control portion and said receptor portion at points of instantaneously different phase of said traveling wave.

2. A signal translating device comprising: a cathode having an elongated electron emissive surface; a low-velocity helical wave-transmission line having an axis substantially parallel with said surface and having an axial length which is large relative to the effective wavelength of a signal wave traveling along said line and further having a longitudinal control portion composed of corresponding segments of all convolutions of said helical line for controlling in accordance with said traveling wave the space electrons originating at said surface and a longitudinal receptor portion electrically coupled to said control portion for deriving a signal from said controlled space electrons; and means including an additional electrode for causing individual space electrons successively to interact with said control portion and said receptor portion at points of instantaneously different phase of said traveling wave.

3. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion composed of corresponding segments of all convolutions of said helical line for controlling in accordance with said traveling wave the space electrons originating at said surface and a longitudinal receptor portion composed of different corresponding segments of all said convolutions for deriving a signal from said controlled space electrons; and means including an additional electrode for causing individual space electrons successively to interact with said control portion and said receptor portion at points of instantaneous phase quadrature of said traveling wave.

4. A signal translating device comprising: a cathode having an elongated electron emissive surface; a low-velocity wave-transmission line longitudinally disposed opposite said surface and having an axial length which is large relative to the effective wavelength of a signal wave traveling along said line and further having a longitudinal control portion adjacent said cathode for controlling in accordance with said traveling wave the space electrons originating at said surface and a longitudinal receptor portion electrically connected to said control portion for deriving a signal from said controlled space electrons; and means including an accelerating electrode for causing individual space electrons successively to interact with said control portion and said receptor portion at points of instantaneous phase quadrature of said traveling wave to impart a direction-sensitive attenuation characteristic to said line.

5. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said cathode for controlling in accordance with said traveling wave the space electrons originating at said surface and a longitudinal receptor portion opposite said control portion and electrically connected thereto for deriving a signal from said controlled space electrons; and means including an accelerating electrode for causing individual space electrons successively to interact with said control portion and said receptor portion at points of instantaneous phase quadrature of said traveling wave to impart to said line a direction-sensitive attentuation characteristic.

6. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said cathode for controlling in accordance with said traveling wave the space electrons originating at said surface and a longitudinal receptor portion opposite said control portion and electrically connected thereto for deriving a signal from said controlled space electrons; and means including an accelerating electrode and collector electrode means for causing individual space electrons successively to interact with said control portion and said receptor portion at points of instantaneously different phase of said traveling wave to impart to said line a direction-sensitive attentuation characteristic.

7. A signal translating device comprising: a cathode having an elongated electron emissive surface; a low-velocity wave-transmission line having an axis substantially parallel with said surface and having an axial length which is large relative to the effective wavelength of a signal wave traveling along said line and further having a longitudinal control portion for controlling in accordance with said traveling wave the space electrons originating at said surface and a longitudinal receptor portion electrically connected to said control portion for deriving a signal from said controlled space electrons; an accelerating electrode longitudinally disposed adjacent said control portion for causing individual space electrons successively to interact with said control portion and said receptor portion; and transverse magnetic field producing means for deflecting said individual space electrons longitudinally of said line to impart a direction-sensitive attenuation characteristic to said line.

8. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion for controlling in accordance with said traveling wave the space electrons originating at said surface and a longitudinal receptor portion electrically connected to said control portion for deriving a signal from said controlled space electrons; an accelerating electrode longitudinally disposed adjacent said control portion for causing individual space electrons successively to interact with said control portion and said receptor portion; and transverse magnetic field producing means for deflecting said individual space electrons longitudinally of said line to impart a direction-sensitive attenuation characteristic to said line.

9. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion for controlling in accordance with said traveling wave the space electrons originating at said surface and a longitudinal receptor portion electrically connected to said control portion for deriving a signal from said controlled space electrons; an accelerating electrode longitudinally disposed adjacent said control portion for causing individual space electrons successively to interact with said control portion and said receptor portion; collector electrode means longitudinally disposed within said line for collecting said electrons after their interaction with said receptor portion; and transverse magnetic field producing means for deflecting said individual space electrons longitudinally of said line to impart a direction-sensitive attenuation characteristic to said line.

10. A signal translating device comprising: a cathode having an elongated electron emissive surface; a low-velocity helical wave-transmission line having an axis substantially parallel with said surface and having an axial length which is large relative to the effective wavelength of a signal wave traveling along said line and further having a longitudinal control portion for controlling in accordance with said traveling wave the space electrons originating at said surface and a longitudinal receptor portion opposite said control portion and electrically connected thereto for deriving a signal from said controlled space electrons; and means including an accelerating electrode longitudinally disposed between said control portion and said receptor portion for causing individual space electrons successively to interact with said control portion and said receptor portion at points of instantaneously different phase of said traveling wave.

11. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion opposite said control portion and electrically connected thereto for deriving a signal from said controlled space electrons; an accelerating electrode longitudinally disposed between said control portion and said receptor portion for causing individual space electrons successively to interact with said control portion and said receptor portion; and transverse magnetic field producing means for deflecting said individual space electrons longitudinally of said line to impart a direction-sensitive attenuation characteristic to said line.

12. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion opposite said control portion and electrically connected thereto for deriving a signal from said controlled space electrons; an accelerating electrode longitudinally disposed between said control portion and said receptor portion for causing individual space electrons successively to interact with said control portion and said receptor portion; and transverse magnetic field producing means for deflecting said space electrons longitudinally of said line to provide a displacement between the point of interaction of said electrons with said receptor portion of substantially one-fourth of said effective wavelength with respect to the point of interaction of said electrons with said control portion to impart to said line a direction-sensitive attenuation characteristic.

13. An electron discharge device comprising: a cathode having an elongated electron emissive surface; a low-velocity obliquely wound helical wave-transmission line having an axis substantially parallel with said surface and having an axial length which is large relative to the effective wavelength of a signal wave traveling along said line and further having a longitudinal control portion for controlling in accordance with said traveling wave the space electrons originating at said surface and a longitudinal receptor portion electrically connected to said control portion for deriving a signal from said controlled space electrons; and means including an additional electrode for causing said individual space electrons successively to interact with said control portion and said receptor portion to impart to said line a direction-sensitive attenuation characteristic.

14. An electron discharge device comprising: a cathode having an elongated electron emissive surface; a low velocity obliquely wound helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion opposite said control portion and electrically connected thereto for deriving a signal from said controlled space electrons; and an accelerating electrode longitudinally disposed between said control portion and said receptor portion for causing individual space electrons successively to interact with said control portion and said receptor portion to impart to said line a direction-sensitive attenuation characteristic.

15. An electron discharge device comprising: a cathode having an elongated electron emissive surface; a low-velocity obliquely wound helical wave-transmission line longitudinally disposed opposite said surface and having an axial length which is large relative to an effective wavelength of a signal wave traveling along said line and further having a longitudinal control portion adjacent said surface for controlling in accordance with said traveling wave the space electrons originating at said surface and a longitudinal receptor portion opposite said control portion and electrically connected thereto and longitudinally displaced with respect to said control portion by substantially one-fourth of said effective wavelength for deriving a signal from said controlled space electrons; and an accelerating electrode longitudinally disposed between said control portion and said receptor portion for causing individual space electrons successively to interact with said control portion and said receptor portion at transversely aligned points to impart to said line a direction-sensitive attenuation characteristic.

16. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion transversely adjacent said control portion and electrically connected thereto for deriving a signal from said controlled space electrons; and means including an accelerating electrode for causing individual space electrons successively to interact with said control portion and said receptor portion at points of instantaneously different phase of said traveling wave.

17. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion transversely adjacent said control portion and electrically connected thereto for deriving a signal from said controlled space electrons; an accelerating electrode longitudinally disposed adjacent said portions on the side thereof remote from said surface for causing individual space electrons successively to interact with said control portion and said receptor portion; and transverse magnetic field producing means for deflecting said individual electrons longitudinally of said line to provide a displacement between the point of interaction of said electrons with said receptor portion by substantially an odd integral multiple of one-fourth of said effective wavelength with respect to the point of interaction of said electrons with said control portion to impart to said line a direction-sensitive attenuation characteristic.

18. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion transversely adjacent said control portion and electrically connected thereto for deriving a signal from said controlled space electrons; an accelerating electrode longitudinally disposed adjacent said control portion on the side thereof remote from said surface for causing individual space electrons to traverse said control portion; a repeller electrode longitudinally disposed within said line adjacent said accelerating electrode on the side thereof remote from said surface for causing said individual space electrons to interact with said receptor portion; and transverse magnetic field producing means for deflecting said individual electrons longitudinally of said line to impart a direction-sensitive attenuation characteristic to said line.

19. A signal translating device comprising: a cathode having an elongated electron emissive surface; a low-velocity helical wave-transmission line longitudinally disposed opposite said surface and having an axial length which is large relative to the effective wavelength of a signal wave traveling along said line and further having a longitudinal control portion adjacent said surface for controlling in accordance with said traveling wave the space electrons originating at said surface and a longitudinal receptor portion transversely adjacent said control portion and electrically connected thereto for deriving a signal from said controlled space electrons; an accelerating electrode longitudinally disposed adjacent said control portion on the side thereof remote from said surface for causing individual space electrons to traverse said control portion; a repeller electrode longitudinally disposed adjacent said accelerating electrode on the side thereof remote from said surface for causing said electrons to interact with said receptor portion; and transverse magnetic field producing means for deflecting said electrons longitudinally of said line to provide a displacement between the point of interaction of said electrons with said receptor portion by substantially an odd integral multiple of one-fourth of said effective wavelength with respect to the point of traversal by said electrons of said control portion to impart to said line a direction-sensitive attenuation characteristic.

20. A signal translating device comprising: a cathode having a pair of oppositely disposed elongated electron emissive surfaces; a pair of series-connected low-velocity helical wave-transmission lines individually longitudinally disposed opposite said respective surfaces and individually having an axial length which is large relative to the effective wavelength of a signal wave traveling along said lines and further individually having a longitudinal control portion adjacent said respective surfaces for controlling in accordance with said traveling wave the space electrons originating at said surfaces and a longitudinal receptor portion electrically connected to said control portion for deriving a signal from said controlled space electrons; and means including an additional electrode for causing individual space electrons successively to interact with said respective control portions and said respective receptor portions at points of instantaneously different phase of said traveling wave.

21. A signal translating device comprising: a cathode having a pair of oppositely disposed elongated electron emissive surfaces; a pair of series-connected low-velocity helical wave-transmission lines individually longitudinally disposed opposite said respective surfaces and individually having an axial length which is large relative to the effective wavelength of a signal wave traveling along said lines and further individually having a longitudinally control portion adjacent said respective surfaces for controlling in accordance with said traveling wave the space electrons originating at said surfaces and a longitudinal receptor portion electrically connected to said control portion for deriving a signal from said controlled space electrons; a pair of accelerating electrodes individually longitudinally disposed between said respective control portions and receptor portions for causing individual space electrons successively to interact with said respective control portions and receptor portions; and transverse magnetic field producing means for deflecting said space electrons longitudinally of said lines to provide a displacement between the points of interaction of said electrons with said respective receptor portions by substantially one-fourth of said effective wavelength with respect to the points of interaction of said electrons with said control portions to impart to said lines a direction sensitive attenuation characteristic.

22. A signal translating device comprising: a cathode having a pair of oppositely disposed elongated electron emissive surfaces; a pair of series-connected low-velocity helical wave-transmission lines individually longitudinally disposed opposite said respective surfaces and individually having an axial length which is large relative to the effective wavelength of a signal wave traveling along said lines and further individually having a longitudinal control portion adjacent said respective surfaces for controlling in accordance with said traveling wave the space electrons originating at said respective surfaces and a longitudinal receptor portion electrically connected to said control portion for deriving a signal from said controlled space electrons; a pair of accelerating electrodes individually longitudinally disposed between said respective control portions and receptor portions for causing individual space electrons successively to interact with said respective control portions and receptor portions; transverse magnetic field producing means for deflecting said electrons longitudinally of said lines; and means for applying different operating potentials to said accelerating electrodes to impart different direction-sensitive attenuation characteristics to said lines.

23. An electron discharge device comprising: a cathode having an elongated electron emissive surface; an accelerating electrode disposed opposite said emissive surface; collector electrode means; and a low-velocity helical wave-transmission line surrounding said accelerating electrode and said collector electrode means.

24. An electron discharge device comprising: a cathode having an elongated electron emissive surface; an accelerating electrode disposed opposite said emissive surface; and a low-velocity helical wave-transmission line surrounding said accelerating electrode and having a control portion interposed between said emissive surface and said accelerating electrode.

25. An electron discharge device comprising: a cathode having an elongated electron emissive surface; an accelerating electrode disposed opposite said emissive surface; focusing electrode means adjacent said accelerating electrode on the side thereof remote from said emissive surface; collector electrode means; and a low-velocity helical wave-transmission line surrounding said accelerating electrode, focusing electrode means, and collector electrode means and having a control portion interposed between said emissive surface and said accelerating electrode.

26. A signal translating device comprising: a cathode having an elongated electron emissive surface; an accelerating electrode disposed opposite said emissive surface; a low-velocity helical wave-transmission line surrounding said accelerating electrode and having an axial length which is large relative to the effective wavelength of a signal wave traveling along said line and further having a control portion interposed between said emissive surface and said accelerating electrode; and means for producing a magnetic field transversely of said line to deflect space electrons originating at said surface longitudinally of said line.

27. An electron discharge device comprising: a cathode having an elongated electron emissive surface; an accelerating electrode disposed opposite said emissive surface; and a low-velocity obliquely wound helical wave-transmission line surrounding said accelerating electrode and spaced therefrom with the individual elements of each pair of opposite sides of said line substantially parallel to each other.

28. An electron discharge device comprising: a cathode having an elongated electron emissive surface; an accelerating electrode disposed opposite said emissive surface; focusing electrode means adjacent said accelerating electrode on the side thereof remote from said emissive surface; collector electrode means; and a low-velocity obliquely wound helical wave-transmission line surrounding said accelerating electrode, focusing electrode means, and collector electrode means.

29. An electron discharge device comprising: a cathode having an elongated electron emissive surface; an accelerating electrode disposed opposite said emissive surface and a low-velocity obliquely wound helical wave-transmission line surrounding said accelerating electrode and having a control portion interposed between said emissive surface and said accelerating electrode.

30. A signal-translating device of the traveling-wave type comprising: means including an electron emissive cathode and an accelerating electrode for projecting a stream of space electrons; and a low-velocity helical wave-transmission line comprising a plurality of coaxial convolutions spaced from said accelerating electrode and disposed with their common axis transverse to said electron stream, said convolutions surrounding said accelerating electrode and said cathode being disposed externally of said convolutions and adjacent to said line.

31. A signal translating device comprising: a cathode having an elongated electron emissive surface; a low-velocity wave-transmission line having an axis substantially parallel with said surface and having an axial length which is large relative to the effective wavelength of a signal wave traveling along said line and further having a longitudinal control portion for controlling in accordance with said traveling wave the space electrons originating at said surface and a longitudinal receptor portion electrically coupled to said control portion for deriving a signal from said controlled space electrons; and means including an additional electrode for causing individual space electrons successively to interact with said control portion and said receptor portion at regions of instantaneously different phase of said traveling wave, said regions each being short relative to said effective wavelength.

References Cited in the file of this patent

UNITED STATES PATENTS

| Number | Name | Date |
|---|---|---|
| 2,064,469 | Haeff | Dec. 15, 1936 |
| 2,122,538 | Potter | July 5, 1938 |
| 2,241,976 | Blewett et al. | May 13, 1941 |
| 2,300,052 | Lindenblad | Oct. 27, 1942 |
| 2,439,401 | Smith | Apr. 13, 1948 |
| 2,559,581 | Bailey | July 10, 1951 |